W. F. DREW.
PIPE COUPLING.
APPLICATION FILED OCT. 1, 1908.

954,504.

Patented Apr. 12, 1910.

Attest:
Tho. Stingmeyer
Alan D. McDonnell

Warren F. Drew, Inventor:
by William R. Baird,
Atty.

UNITED STATES PATENT OFFICE.

WARREN F. DREW, OF NEW YORK, N. Y.

PIPE-COUPLING.

954,504.   Specification of Letters Patent.   Patented Apr. 12, 1910.

Application filed October 1, 1908. Serial No. 455,690.

*To all whom it may concern:*

Be it known that I, WARREN F. DREW, a citizen of the United States, and resident of New York, N. Y., have invented certain new and useful Improvements in Pipe-Couplings, of which the following is a specification.

My invention relates to couplings for pipes and its novelty consists in the construction and adaptation of the parts as will be more fully hereinafter pointed out.

In Letters Patent of the United States No. 672,598 issued to me April 23, 1901 there is described a pipe coupling upon which my present invention is an improvement. The coupling sections shown in that patent were difficult to cast and difficult also to uncouple. My present invention obviates both of these disadvantages and enables me to cast both sections more easily and readily to disassemble or uncouple the parts after they have been joined together.

Figure 1:
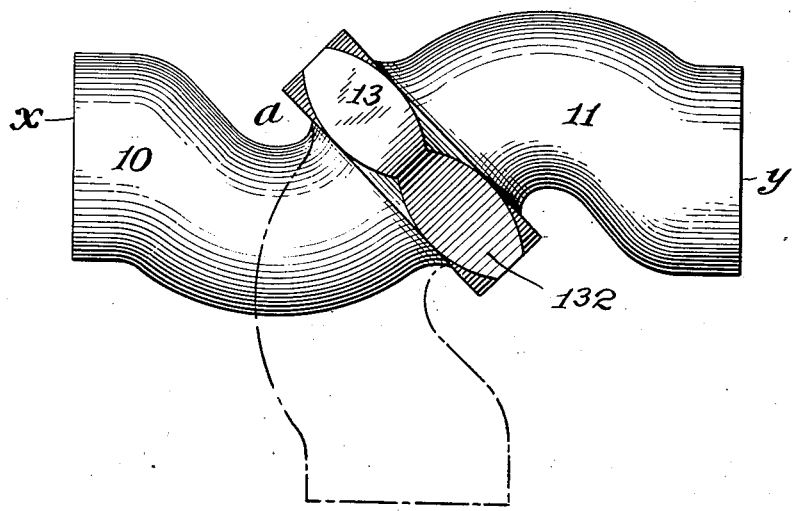
Figure 2:
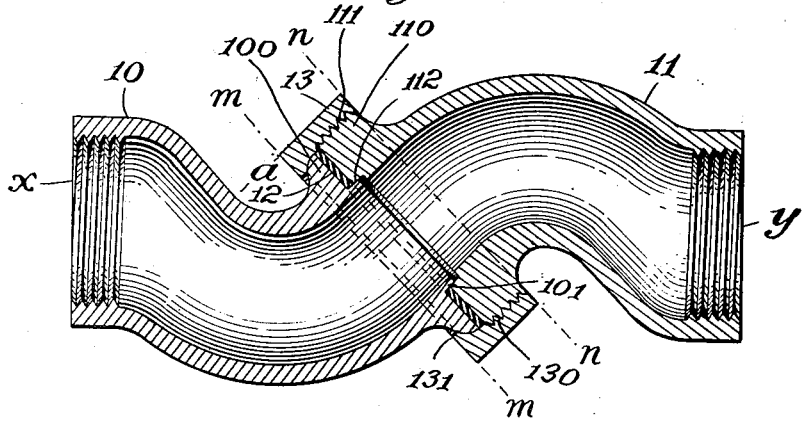

In the drawings, Figure 1 represents two sections joined together, an alternate position of one section being indicated in dotted outline; Fig. 2 is a central longitudinal section through the parts shown in Fig. 1.

In the drawings, 10 is one section of my improved pipe coupling and 11 is the other section thereof. Both of these sections terminate outwardly in planes $x$ and $y$ at right angles to their axial lines at that point and both are inwardly threaded at such terminals in order to engage with the pipes or other structural elements adapted to be secured together thereby. Both of the sections are tubular in construction and both decrease in cross sectional area and inward diameter from their terminal planes $x$ and $y$ and both are identically formed until they reach planes $m$—$m$ and $n$—$n$ at angles of 45 degrees respectively to the planes $x$ and $y$. On account of the decrease of the cross sectional area and inner diameter from the terminal planes $x$ and $y$, the capacity of the two sections at their point of juncture can be the same as the capacity of the pipes to be united by the coupling, the threaded outer ends of the sections of the couplings being large enough to receive wholly within them the said pipes to be coupled, it being unnecessary to weaken the joint by decreasing the thickness of the pipes to be coupled or of the outer threaded ends of the coupling sections as in former constructions, in order to accommodate the threaded ends of pipes having substantially the same bore as the sections of the couplings at their point of juncture. The bore of the sections being of identical form and size, the same core box may be used in casting them. At the plane $m$—$m$ the section 10 is expanded to form a flange 100. At the plane $n$—$n$ the section 11 is similarly expanded to form a flange 110 externally threaded at 111. A circular ledge 101 on the flange 100 and a corresponding recess 112 on the flange 110 serve to position the sections with respect to each other. A packing ring 12 of elastic material is adapted to prevent leakage from the contacting surface of the two sections. A circumferential ring 13 is provided with threads 130 at a portion of its inner surface to engage the threaded surface 111 of the section 10. A further portion 131 of the inner surface of this ring is smooth and is adapted to extend over and embrace the outer surface of the flange 100. It will be noted that the plane of contact of the two sections is at right angles to their common axial line at that point and at an angle of 45° with each plane $x$ and $y$.

In assembling the sections to form a coupling, the ring 13 is slipped over the section 10 so that its surface 131 is in contact with the smooth outer surface of the flange 100. The other section 11 of the coupling is brought to contact with the section 10 and the threaded portion 130 of the ring 13 is caused to engage with the threaded portion 111 of the section 11. A tight joint is readily secured by tightening the ring 13 which has outer plane angular surfaces 132 to serve as a nut. It is obvious that by loosening this ring by a suitable tool the sections 10 and 11 may be turned at any angle with respect to each other, as indicated in Figs. 1 and 2 by the dotted lines and then tightened into their new position. In order to disengage the ring 13 from the sections and disassemble the parts it is necessary that the space $a$ between the outer surface of the ring 13 on its side toward the section 10 and the outer wall of that section should be sufficient to permit the disengagement of the outermost thread of the ring 13 with the outermost thread of the section 11. In other words, that this space should equal the width of the threaded portion of the ring 13. Otherwise no disengagement could take place.

My device forms a cheap form of coupling, readily made, assembled and disassembled and adaptable to a great variety of uses.

In couplings heretofore made in which the bore of the members of the coupling does not increase in diameter from the abutting ends outward, the connected pipes project into the interior in such a manner as to cause matter contained in the liquid passing through them to lodge against the ends of the pipes and remain there, which makes such forms of coupling inapplicable for use where solid materials are apt to be contained in the fluid, for instance, as in sewer pipes, or in pipes used for the transportation of wine or beer.

By referring to the drawing in the present instance, it will be noticed that the circumferential nut 13 would be entirely inclosed within a cylinder of a diameter to inclose the fittings 10 and 11. This is due also to the reduction of the diameter of the fittings toward their abutting ends and such reduction enables a nut to be applied to couple fittings together without exceeding in diameter the width of the fittings in a plane at right angles to the axial line. This construction enables the coupling to be inserted between two closely placed parallel walls, or inside of a larger pipe, or the like, which is impossible with the constructions now known.

What I claim as new is:—

1. In a device of the class described, a flanged fitting, a threaded nut having a flange, coöperating with the flange of the fitting, the fitting having a bend commencing substantially at its flange, the distance between the flanged end of the nut and the portion of the bend opposite thereto being not less than the depth of the threaded portion of the nut, and a second fitting having terminal threads to receive the said nut.

2. In a device of the class described, an elbow fitting having the elbow made in two parts, one flanged and the other threaded, and a flanged nut connecting the two parts, the distance between the flanged end of the nut and the opposing portion of the wall of the part upon which it is carried being not less than the depth of the threaded portion of the nut.

3. In a device of the class described, an elbow fitting comprising two similarly shaped parts, one flanged, and the other threaded, and a flanged nut connecting the two parts, the distance between the ends of the nut parts, one flanged, and the other threaded, fitting and the opposing portions of the walls of the fittings being substantially equal and not less than the depth of the threaded portion of the nut.

4. In a device of the class described, an elbow fitting having the elbow made in two parts, the adjoining ends of which are adapted to be connected in axial alinement, said parts flaring outwardly from their attaching portions, one of said parts being flanged and the other threaded, and a flanged nut connecting the two parts, the distance between the flange of the nut and the opposing portion of the wall of the part on which it is carried being not less than the depth of the threaded portion of the nut.

Witness my hand this 30th day of September 1908, at New York, N. Y.

WARREN F. DREW.

Witnesses:
T. W. SPRINGMEYER,
MAY HUGHES.